: US006201030B1

United States Patent
Beer

(10) Patent No.: US 6,201,030 B1
(45) Date of Patent: Mar. 13, 2001

(54) PROCESS AND APPARATUS FOR REGENERATING A PARTICULATE CATALYST

(75) Inventor: Gary L. Beer, Plano, TX (US)

(73) Assignee: Syntroleum Corporation, Tulsa, OK (US)

(*) Notice: Subject to any disclaimer, the term of this patent is extended or adjusted under 35 U.S.C. 154(b) by 0 days.

(21) Appl. No.: 09/408,021

(22) Filed: Sep. 22, 1999

(51) Int. Cl.[7] ................................................. C07C 27/00
(52) U.S. Cl. ......................... 518/709; 518/706; 518/715
(58) Field of Search .................... 518/706, 709, 518/715

(56) References Cited

U.S. PATENT DOCUMENTS

| | | | |
|---|---|---|---|
| 2,414,276 | 1/1947 | Sensel et al. | 260/449.6 |
| 2,670,364 | 2/1954 | Hemminger | 260/449.6 |
| 5,260,239 | 11/1993 | Hsia | 502/30 |
| 5,268,344 | 12/1993 | Pedrick et al. | 502/30 |
| 5,283,216 | 2/1994 | Mitchell | 502/30 |
| 5,288,673 | 2/1994 | Behrmann et al. | 502/30 |
| 5,811,363 | 9/1998 | Leviness et al. | 502/21 |
| 5,811,468 | 9/1998 | Chang et al. | 518/700 |
| 5,817,701 | 10/1998 | Leviness et al. | 518/700 |
| 5,821,270 | 10/1998 | Chang et al. | 518/700 |

Primary Examiner—Johann Richter
Assistant Examiner—J. Parsa
(74) Attorney, Agent, or Firm—Baker Botts L.L.P.

(57) ABSTRACT

A method of regenerating a finely-divided particulate catalyst involves the use of an external regeneration system comprising first and second regeneration stations. The method is particularly adapted to regenerating supported catalysts used in Fischer-Tropsch slurry reactors. A slurry-containing partially spent catalyst is flowed from the reactor and alternately regenerated in one of the first and second regeneration stations. The alternate use of the stations for catalyst regeneration permits one station to receive partially deactivated slurry from the reactor while the other station returns regenerated slurry to the reactor. The operation of the reactor thus may be continuous.

11 Claims, 1 Drawing Sheet

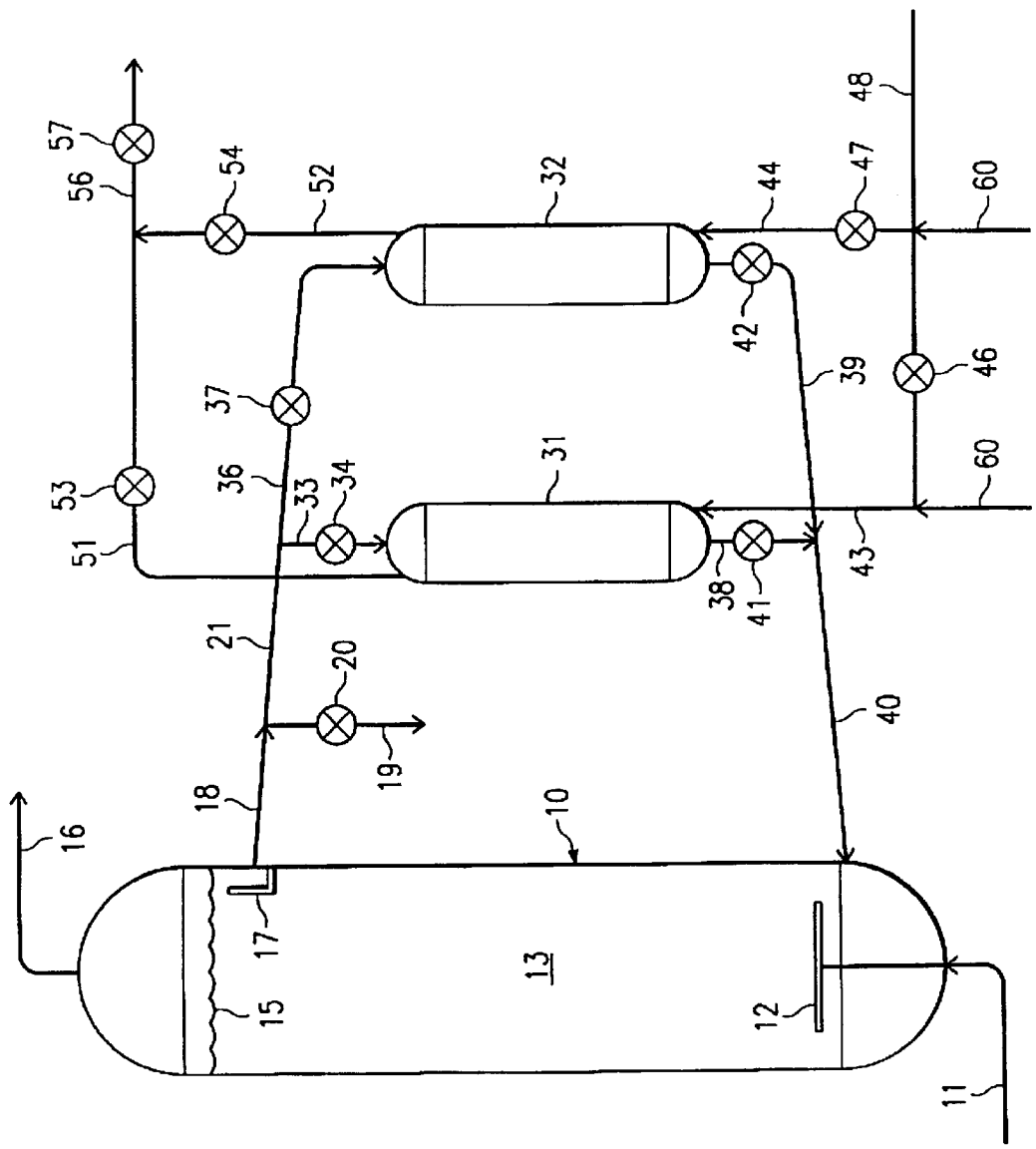

PROCESS AND APPARATUS FOR REGENERATING A PARTICULATE CATALYST

BACKGROUND OF THE INVENTION

1. Field of the Invention

This invention relates generally to the regeneration of a partially spent catalyst used in the synthesis of hydrocarbons from a synthesis gas. In one aspect, the invention relates to regenerating Fischer-Tropsch catalysts used in slurry reactor processes. In still another aspect, the invention relates to the regeneration of a Fischer-Tropsch catalyst in external regenerating vessels.

2. Brief Description of the Prior Art

The production of hydrocarbons from synthesis gas ($H_2$ and CO) is well-known and is described at length in the patent and technical literature. Although fixed bed, fluidized bed, entrained bed, and ebullating bed reactors have been used with a variety of catalysts, the slurry reactor process has received considerable attention in recent years.

In the slurry reactor process, finely divided catalyst is suspended in a heavy oil (e.g., paraffinic hydrocarbon) by bubbling synthesis gas through the reactor. The hydrocarbon reaction products are recovered in the overhead stream and from a slurry discharged from the reactor.

One of the problems associated with the slurry reactor process is that the activity of the catalyst deteriorates with use. The reason for the deterioration is not fully understood but is believed to be due in part to contaminants and reaction products which reversibly deactivate the catalyst.

In order to maintain an effective operation, the spent catalyst must be regenerated or replaced from time to time. (The terms "regenerate", "reactivate", and "rejuvenate" are used herein to mean the same thing: to increase the activity of the reversibly deactivated catalyst.)

Processes for regenerating Fischer-Tropsch catalysts used in slurry reactor processes are described in the following patents:

(a) U.S. Pat. No. 5,260,239 discloses a process wherein an external rejuvenation vessel is used to continuously receive partially spent catalyst slurry from a synthesis reactor vessel with the catalyst being rejuvenated by the passage of hydrogen therethrough in the rejuvenation vessel. The catalyst flow between the vessels is solely by gravity.

(b) U.S. Pat. No. 5,288,673 discloses a catalyst rejuvenation system comprising vertical draft tubes immersed in the slurry within the reactor. Hydrogen is passed upwardly through the draft tubes carrying catalyst slurry with it. Rejuvenated catalyst is ejected at the top of each tube into the top of the slurry reactor. Other draft tube rejuvenations are disclosed in U.S. Pat. No. 5,268,344.

(c) U.S. Pat. No. 5,283,216 discloses a method of rejuvenating a Fischer-Tropsch catalyst by passing hydrogen through the catalyst suspended in a liquid hydrocarbon.

(d) U.S. Pat. No. 5,811,363 discloses a catalyst regenerator for slurry reactors wherein the regenerator includes means for separating regenerated off gas from the regenerated catalyst.

(e) U.S. Pat. No. 5,811,468 discloses a catalyst regenerator for a slurry reactor wherein the catalyst slurry is passed through a gas disengaging zone and then into a catalyst regenerating tube.

(f) U.S. Pat. No. 5,817,701 discloses a process for regeneration of catalysts used in Fischer-Tropsch reactors of $H_2$ and CO, wherein CO is purged from the reactor prior to introduction of $H_2$ regeneration gas.

(g) U.S. Pat. No. 5,821,270 discloses a slurry reactor catalyst regeneration process wherein the slurry is passed successively through at least two regeneration stages.

The above U.S. Patents are representative of recent patents relating to slurry regeneration by hydrogen, either in the reactor or in a separate regeneration vessel or tube, and are hereby incorporated in their entirety by reference.

The regeneration of Fischer-Tropsch catalyst by hydrogen, however, has long been known for other types of reactors. For example, U.S. Pat. No. 2,414,276 discloses the use of hydrogen to regenerate a particulate catalyst suspended in a gas. The regeneration is continuous and carried out in a vessel external of the reactor. Another early U.S. Pat. No. 2,670,364, relating to Fischer-Tropsch fluidized bed reactors, discloses an external hydrogenation vessel for regenerating catalyst withdrawn from the reactor. These patents are also incorporated in their entirety by reference.

SUMMARY OF THE INVENTION

The regeneration of a partially deactivated synthesis gas particulate catalyst is carried out in a regeneration system comprising two alternating regeneration vessels (stations). The partially deactivated particulate catalyst, typically a supported catalyst, is alternately passed for regeneration to one of the two vessels. The use of alternate regeneration vessels permits a quantity of the partially deactivated catalyst to be flowed from the reactor to a first regeneration vessel as a like quantity of regenerated catalyst is returned to the reactor from a second regeneration vessel so that the reactor may be operated continuously at substantially the same level.

The catalyst is preferably a cobalt catalyst supported on a refractory oxide and suspended in a hydrocarbon liquid to form a slurry. The slurry containing the catalyst is treated in each regeneration vessel or an associated regeneration system with a regeneration gas, preferably hydrogen, or by other suitable regenerating techniques. When applied in the regeneration of a catalyst in a slurry, the alternate use of regenerating vessels according to the present invention results in the slurry volume in the reactor remaining substantially constant during its continuous operation.

Thus, the process of the present invention has characteristics of both continuous and batch processes. The slurry reactor operation is continuous during catalyst regeneration and the catalyst in the slurry is regenerated in batches by alternating the regenerating vessels. Each regeneration station preferably includes a single vessel, but each vessel may serve as a regenerator alone or in combination with other vessels.

The preferred regeneration system comprises two vessels having their inlets and outlets connected to the reactor, valved flow lines for selectively controlling slurry flow between the reactor and each vessel, and regeneration gas facilities for treating the slurry in each vessel.

BRIEF DESCRIPTION OF THE DRAWING

The FIGURE is a schematic flow diagram of a slurry reactor provided with an external catalyst regeneration system of the present invention.

DESCRIPTION OF THE PREFERRED EMBODIMENTS

The method and apparatus of the present invention will be described with reference to the FIGURE.

Although the invention is described with emphases on a Fischer-Tropsch slurry reactor, it is to be understood that this description is for purposes of illustration only, and that the principles embodied in the invention are equally applicable to other reactor systems and other particulate catalyst regenerating systems.

A Fischer-Tropsch reactor 10 receives a synthesis gas through a feed line 11 and an internal distributor such as a sparger 12. The synthesis gas comprises $H_2$ and CO, and may contain other gases such as $N_2$ and $CO_2$. The mole ratio of the reactants $H_2$ and CO may range within relatively wide limits depending on the desired product, but normally will be between 3:1 to 1:1, preferably 2:1. The reactor 10 may also contain internal heat exchange tubes (not shown) which conduct water and steam through reactor 10 and provide temperature control therefor.

During steady state operations, the reaction of $H_2$ and CO in the presence of a Fischer-Tropsch catalyst produces a heavy hydrocarbon liquid phase 13 and a gas stream. The gas is withdrawn through an overhead line 16 and further processed downstream.

A liquid level 15 in reactor 10, controlled by a weir 17, is generally maintained slightly above a top of weir 17. The space within reactor 10 above liquid level 15 serves as a degassing zone. The hydrocarbon liquid has a finely divided Fischer-Tropsch catalyst suspended therein forming a slurry. The synthesis gas entering near the bottom of reactor 10 bubbles through the slurry keeping the catalyst particles uniformly suspended in the hydrocarbon liquid. The slurry in the reactor thus is a three-phase slurry comprising hydrocarbon liquid, synthesis gas and gas reaction products, and finely divided catalyst solids. The volume ratios of the phases within reactor 10 may vary within relatively wide ranges depending on several factors, such as reactor operating conditions, desired products, type of catalyst, etc. The following, however, is representative of the phases in the reactor:

Liquid phase (heavy hydrocarbon liquid): from 30 to 90 vol %

Gas phase (synthesis gas and gas reaction products): from 5 to 40 vol %

Solid phase (catalyst particles): from 5 to 30 vol %

The hydrocarbon liquid is a heavy hydrocarbon (mainly $C_{10}$ and higher) reaction product of the Fischer-Tropsch reaction and is principally mixed paraffinic hydrocarbons.

The catalyst used in the Fischer-Tropsch reaction may be a Group VIII metal, preferably cobalt or iron and most preferably cobalt. The cobalt catalyst is preferably a supported catalyst wherein the cobalt is supported on a Group IV B oxide support having an average particle size from about 10 to about 100 microns. Preferred supports include refractory oxides, silica, alumina, aluminates, titania, and the like.

Methods of manufacturing, promoting and using Group VIII metal supported catalysts are well known to those skilled in the art and are described at length in the patent and technical literature.

The gaseous products may include middle distillate paraffins. The gas stream withdrawn from the reactor may also include water and unreacted components of the synthesis gas.

As shown in the FIGURE, two catalyst regenerating vessels 31 and 32 are connected in parallel to reactor 10. The preferred embodiment of the regeneration system described herein employs one vessel at each station (vessel); however, it is contemplated that more than one vessel can be used at each station, as for example in stations where regeneration is by more than one treatment. Two or more vessels at each station could be used in such regeneration treatments.

During an illustrative hydrogen regeneration operation, the degassed slurry overflowing weir 17 passes through a reactor discharge line 18 and downstream through a line 19 for further processing, product separation, return to a lower part of reactor vessel 10 and the like. A valve 20 controls the flow through line 19.

A line 21 leads from line 18 to vessels 31 and 32. Although valve 20 in line 19 may be used to divert all or part of the slurry exiting reactor 10 through line 18 to line 21, it is preferred that valve 20 remain at least partially open during normal regeneration to regulate flow through line 19. Note that line 21 leading to the regeneration system may be connected directly to the reactor 10 to receive slurry overflow from weir 17.

Although it is not necessary for purposes of the present invention, it is preferred that vessels 31 and 32 are identical in shape and construction and are located side-by-side to facilitate their alternating use as described below. For most operations, the volume of each regenerating vessel 31 and 32 may be from about 5 to about 30%, and preferably about 5 to about 20%, of the effective volume of reactor 10.

Vessel 31 is fed by a line 33 provided with a valve 34; and vessel 32 is fed by a line 36 provided with a valve 37. Lines 33 and 36 are each in fluid communication with line 21 as described above. The outlets of vessels 31 and 32 are provided with valved discharge lines 38 and 39, respectively (valve 41 in line 38 and valve 42 in line 39). A line 40 returns the slurry from lines 38 and 39 to a lower part of reactor 10. Lines 38 and 39 may be provided with check valves (not shown) to prevent backflow into regenerating vessels 31 and 32.

A regenerating gas (e.g., hydrogen) is introduced into the bottom of a selected one of vessel 31 and 32 by lines 43 and 44, respectively. Valve 46 in line 43 and valve 47 in line 44 permits selective flow of regenerating gas to each of vessel 31 and vessel 32. Line 48 connected to lines 43 and 44 delivers hydrogen from a source (not shown).

The preferred regeneration gas is hydrogen, but other gases, such as nitrogen, may be used alone or in combination with hydrogen.

For purposes of illustration, the regeneration system of the present invention will be described with reference to hydrogen as the regeneration gas, but it is to be understood that this is a nonlimiting example. The hydrogen can be supplied by a generator or from another part of the plant.

Vessels 31 and 32 are provided with valved gas exhaust lines 51 and 52 (valve 53 for line 51 and valve 54 for line 52). Exhaust gas streams withdrawn from vessels 31 and 32 are flowed through a line 56 provided with a valve 57. The exhaust gas which includes unreacted hydrogen, reaction products, and the like may be further processed to recover hydrogen for recycling to the regeneration system.

Each of vessels 31 and 32 in its regeneration mode operates in the same way: degassed slurry flows by gravity from reactor 10 into a top portion of a regenerating vessel (e.g. vessel 31) with hydrogen (or other dispersing or regenerating gas) simultaneously entering a bottom portion of vessel 31. The hydrogen or other dispersing gas bubbling through the slurry in vessel 31 maintains the catalyst particles suspended therein. In this mode, slurry inlet valve 34 and hydrogen valve 46 are open and slurry outlet valve 41 is closed. The slurry fills vessel 31 to a selected level, at which time slurry inlet valve 34 is closed. The flow of hydrogen through the active vessel continues or is initiated and maintained until catalyst regeneration is complete, with valves 46, 53 and 57 being open.

A novel feature of the present invention is the alternating operation of the regenerating vessels 31 and 32. This enables the volume of the reactor (slurry, catalyst and gas bubbles) to remain substantially the same. Thus, catalyst regeneration need not interrupt the operation of reactor 10. As noted earlier, it is preferred to operate reactor 10 continuously without interruption.

In normal operation (without catalyst regeneration), synthesis gas is bubbled through slurry 13 in reactor 10. Degassed liquid hydrocarbon slurry overflows weir 17 and gaseous hydrocarbon exit through overhead line 16. In this phase of the operation, valve 20 is open and regeneration system inlet valves 34 and 37 are closed. Liquid hydrocarbons may be separated from the slurry from weir 17 with the remaining slurry being returned to reactor 10 or passed to further processing.

For startup of catalyst regeneration, both vessels 31 and 32 will be empty of slurry. To initiate regeneration, as for example in vessel 31, valve 34 is opened and valves 41 and 37 will be closed. Degassed slurry flows through lines 18, 21 and 33 into vessel 31. Hydrogen may simultaneously be flowed upwardly through vessel 31 (valves 46, 53 and 57 are open) to maintain the catalyst particles suspended in the hydrocarbon liquid. When the slurry in vessel 31 reaches the desired level, inlet valve 34 is closed. Hydrogen flow is continued through vessel 31 for a period of time to regenerate the catalyst therein.

When the catalyst in vessel 31 is regenerated to the desired extent, the operation of alternating vessels 31 and 32 may begin. Vessel 31 outlet valve 41 is opened, and vessel 32 inlet valve 37 is opened. Regenerated slurry flows from vessel 31 and returns to reactor 10 through lines 38 and 40. This displaces a like amount of slurry over weir 17 and accelerates the flow of degassed slurry into vessel 32 through lines 18, 21 and 36. Note that in the preferred mode of operation, degassed slurry may continue to flow through line 19.

The slurry in vessel 31 will not all flow back into vessel 31 by gravity alone.

Flow from vessel 31 to reactor 10 may be accelerated and completed by injection of pressurized gas above the slurry therein. This can be achieved by closing hydrogen exhaust valve 53 while continuing the injection of hydrogen into vessel 31 through line 43. The hydrogen accumulates in the upper part of vessel 31 and develops sufficient pressure to force the regenerated slurry from vessel 31 into reactor 10. Alternatively, a separate gas (e.g. nitrogen) may be injected through a line 60 to displace with the slurry from either or both of the vessels.

Simultaneous with the emptying of slurry from vessel 31, vessel 32 is being filled. It is preferred that the amount of degassed slurry flowing into vessel 32 is substantially equal to that displaced from vessel 31.

During the filling of vessel 32, hydrogen can be injected therethrough to maintain the catalyst particles in suspension. With vessel 32 filled to the desired level, the hydrogen flow is continued through vessel 32 until the catalyst is sufficiently regenerated.

Regenerated catalyst slurry is pressure flowed out of vessel 32 into a lower part of reactor 10 while simultaneously therewith, slurry with partially deactivated catalyst is flowed into vessel 31. As in the case of discharging slurry from vessel 31, discharging slurry from vessel 32 may be accelerated and completed by the use of pressurized hydrogen or other gas injected into vessel 32.

Catalyst regeneration may continue by alternating slurry flow to and from vessels 31 and 32 in the manner described above.

The operating parameters of the regeneration system of the present invention will depend upon a variety of factors, as known to those skilled in the art, including reactor and vessel volumes, catalyst, reaction products, operating temperature, pressure, and synthesis gas quality, feed rates, to name but a few of the variables.

The catalyst regeneration can begin when the catalyst has deteriorated sufficiently to reduce catalyst activity below a desired level. Regeneration is designed to maintain the activity of the catalyst in reactor 10 at an overall level from about 50 to about 90%, preferably from about 70 to about 90% of its original activity. The operation of the regeneration vessels preferably maintains the overall activity of the catalyst in the reactor at a substantially constant desired level. This level can be changed by controlling the operation of the regeneration system (e.g. hydrogen flow, treatment times and rates, etc.)

Further, the catalyst regeneration system discussed above for use in hydrogen regeneration can also be used when different regeneration systems are required. In such instances it may be desirable to conduct these operations in separate vessels, which is readily accomplished by simply withdrawing the volume of catalyst from one of the two regeneration vessels and completing the regeneration step and thereafter returning the withdrawn catalyst to one or the other of the regeneration vessels for return to the reactor as discussed above. Other steps may be used and other regeneration systems may be used if considered necessary or desirable. It is contemplated, however, that the use of the present system, which allows the withdrawal of a controlled amount of catalyst-bearing slurry from the reactor, while returning an equal volume of regenerated slurry to the reactor will be effective in such process variations. The fact that the treatment requires more than one vessel in no way detracts from the ability of the present system to remove partially deactivated catalyst from the reactor and simultaneously return a like quantity of regenerated catalyst to the reactor.

While the present invention has been described by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

I claim:

1. A method of regenerating particulate catalyst used in a slurry reactor for the processing of a synthesis gas, the reactor containing a slurry containing a liquid, suspended finely-divided particulate catalyst and finely dispersed gas bubbles, the method comprising:
   a) flowing a slurry of partially deactivated particulate catalyst from the reactor to a selected one of a first regeneration vessel or a second regeneration vessel;
   b) regenerating the partially deactivated catalyst slurry flowed to the selected one of the first or second regeneration vessels to produce a regenerated catalyst slurry;
   c) returning the regenerated catalyst slurry from the selected one of the first or second regeneration vessels to the reactor; and
   d) simultaneously with the return of the regenerated catalyst slurry to the reactor, withdrawing a substantially equivalent volume of partially deactivated catalyst slurry from the reactor into the other of the first or second regeneration vessels.

2. The method of claim 1 wherein the step of returning the regenerated catalyst slurry from one of the vessels to the reactor accelerates the flow of partially spent catalyst slurry to the other vessel.

3. The method of claim 1 wherein the liquid level in the reactor remains substantially constant.

4. The method of claim 1 wherein the liquid is a heavy hydrocarbon liquid.

5. The method of claim 1 wherein the processing of the synthesis gas in the reactor produces a hydrocarbon gas and a hydrocarbon liquid.

6. The method of claim 1 wherein the catalyst is a cobalt catalyst supported on a refractory oxide and having an average particle size of 10 to 100 microns.

7. The method of claim 1 wherein the regeneration step comprises passing a regeneration gas in contact with the partially spent catalyst slurry.

8. The method of claim 7 wherein the regeneration gas is hydrogen.

9. A method of regenerating a Fischer-Tropsch particulate catalyst used in a slurry reactor which comprises the steps of:

a) flowing the slurry containing the partially deactivated particulate catalyst from the reactor to a regeneration system wherein the slurry is alternatively passed into a selected one of a first vessel or a second vessel, the slurry being subjected to catalyst regeneration in the selected one of the vessels by passing a regeneration gas through the slurry for a sufficient time to regenerate the partially deactivated catalyst to produce a regenerated catalyst slurry;

b) returning the regenerated catalyst slurry from the selected one of the vessels to the reactor; and c) simultaneously with the return of the regenerated catalyst slurry to the reactor, withdrawing a substantially equivalent volume of partially deactivated catalyst slurry from the reactor into the other of the first or second vessels.

10. The method of claim 9 wherein the catalyst is a supported cobalt catalyst.

11. The method of claim 9 wherein the regeneration gas is hydrogen.

* * * * *